United States Patent Office 3,737,407
Patented June 5, 1973

3,737,407
BISPHENOL-A-FUMARATE POLYESTER-CINNAMATE PHOTOPOLYMER
Daniel C. Thomas, Covina, Calif., assignor to Lithoplate, Inc., Covina, Calif.
No Drawing. Continuation of abandoned application Ser. No. 835,764, June 23, 1969. This application June 1, 1971, Ser. No. 149,024
Int. Cl. C08g *17/10, 17/14*
U.S. Cl. 260—47 UA
1 Claim

ABSTRACT OF THE DISCLOSURE

Bisphenol-A-fumarate polyester resin is reacted with a cinnamoylating agent, such as cinnamoyl chloride, to give a photopolymer, useful in lithographic plates.

---

This is a continuation of copending application Ser. No. 835,764, filed June 23, 1969, now abandoned.

This invention relates to a new photopolymer suitable for use on lithographic plates and for other photomechanical processes. It also relates to a method for preparing the new photopolymer.

One object of this invention is to provide an inherently light-sensitive polymer for use in the graphic arts and particularly for preparing or forming surface-type lithographic plates and etching resists.

Another object of the invention is to provide a photopolymer which may be applied directly in contact with a metal support member or over a sub-layer that lies on top of the metal. The photopolymer may be applied directly to many different types of metal surfaces, such as steel, copper, and aluminum without producing undesirable effects.

The photopolymer of this invention is suitable for a variety of uses in lithographic and photomechanical processes, including the production of printed circuits, chemical milling, and chemical etching processes. It enables the utilization of automated processes in producing printed plates for use in lithographic operations, since it is capable of being developed by organic solvents as well as by emulsion developers.

According to the present invention, a bisphenol-A-fumarate polyester resin is reacted with a cinnamoylating agent, such as cinnamoyl chloride, in the presence of a solvent. Subsequently, the novel bisphenol-A-fumarate polyester cinnamate resin of this invention is precipitated.

An important feature of the invention is its use of bisphenol-A-fumarate polyester, described in U.S. Pat. No. 2,634,251. As set forth in the noted Kass patent, that invention contemplated the esterification of a dihydric alcohol conforming to the formula listed below:

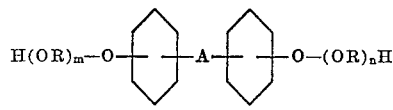

wherein A is a 2-alkylidene radical with three to four carbon atoms, R is an alkylene radical with two to three carbon atoms, m and n are each at least one and the average sum of m and n is not greater than three; with an approximately equal molar quantity of dicarboxylic acid. Kass discloses as useful dicarboxylic acids at least a major portion of fumaric or maleic acid or maleic anhydride; and also, that the polyester of his patent can be made by esterification techniques well known in the art and as described therein. As one species, the patentee has claimed in claim 2 "A curable polyester resin having a melting point of at least 90° C., comprising the esterification product of 2.2-di(4-beta hydroxy ethoxy phenyl) propane and fumaric acid." He more broadly claims at claim 7, for instance. "A curable polyester resin having a melting point of at least 80° C., comprising the esterification product of a dihydric alcohol conforming to the formula

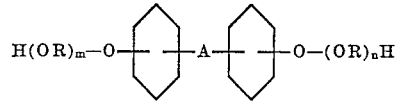

wherein R is an alkyne radical having from two to three carbon atoms, A is a 2-alkyldine radical having from three to four carbon atoms, m and n are each at least one, and the average sum of m and n is not over three; with a substantially equal molar quantity of 1, 2 dicarboxy ethane." Basically, the resin of the present invention is made by reacting a bisphenol derivative with fumaric acid. The chemical structure of this resin imparts superior resistance to water, acids, and bases, particularly at elevated temperatures. As a result, it has a higher heat distortion temperature, about 285° F., than do conventional polyesters. The same material has excellent electrical properties, particularly after exposure to high humidity, which enables the product of this invention to be of use in making printed circuits. The base resin also has significant temperature-viscosity-gelation characteristics which give it good strength. Also, it can tolerate more styrene than can conventional polyester resins without a loss of physical properties, so that cost reduc- 5–10 percent lower than the actual polyester resins.

These resins are sold under the trademark Atlac in tion is significant. Further, it has a specific gravity about several different types, some of which are as follows:

| Atlac | 382E | 382–13 | 382–2 | 382–05 |
|---|---|---|---|---|
| Resin-styrene ratio | Solid | 67/33 | 60/40 | 50/50. |
| Viscosity (cps.) 23° C | | 13,000±2,000 | 2,300±200 | 500±100. |
| Acid number of liquid | Max. 27 | Max. 18 | Max. 16 | Max. 14. |
| Color | Amber | Amber | Amber | Amber. |
| Specific gravity | | 1.08 | 1.06 | 1.03. |
| Storage life at 75° F | 2 years or more | 6 months | 6 months | 6 months. |
| Physical form | 40 mesh powder | Liquid | Liquid | Liquid. |
| Softening point | 106° C. max | | | |
| Catalyzed shelf life at 75° F.: | | | | |
| 1% BPO | | 3 weeks | 3 weeks | 3 weeks. |
| 1% TBPB | | 3 months | 3 months | 3 months. |
| 1% MEKP | | 1 week | 1 week | 24 hours. |

Atlac 382 resin has an acid number of 20, which is an indication that free carboxyl groups are present in the resin which may react with the cinnamoyl chloride to form the bisphenol-A-fumarate polyester cinnamate photopolymer of this invention.

As an example of the invention, 10 grams of Atlac 382E, 10 grams of cinnamoyl chloride, and 30 cc. of n-methyl-2-pyrrolidone are added to a 250 ml. beaker and heated to 112° C., at atmospheric pressure to dissolve the resin. Then, the mixture is heated at 112° C.–124° C., for one hour to produce the desired reaction. The bisphenol-A-fumarate polyester cinnamate reaction product may then be precipitated in 200 ml. methanol and water, washed several times with methanol and water to remove cinnamoyl chloride, and then dried.

The photopolymer of this example has been used successfully on ball grained aluminum plates to make a presensitized negative-working lithographic printing plate; it gave a good strong image upon exposure and development.

The photoploymer of this example has also been used to make a presensitized negative-working diazo-photopolymer plate by overcoating a high-speed negative-working diazo plate with the photopolymer. It gave good results with ten-second exposures.

The same photopolymer has also been used successfully to make positive-working diazo-photopolymer plates.

In addition, the photopolymer of this invention can be used to make a photoresist plate. For example, ten parts by weight of the bisphenol-A-fumarate polyester-cinnamate polymer were dissolved in two hundred parts by weight of cyclohexanone, with one part of Michler's Ketone. The solution was applied to a printed circuit board, and the solvent was evaporated. Then, the board was dried to remove residual solvent, giving an unexposed photoresist plate.

This plate was then exposed, through a negative of a desired printed circuit, for ten minutes to a xenon arc lamp at 1200 foot candles. The exposed plate was developed by rocking it in xylene to remove the unexposed areas, and then the plate was dried. After drying, the plate was etched with a 42° Bé. ferric chloride solution to give the desired printed circuit.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A photopolymer resin prepared according to a process which comprises,
    (a) dissolving a bisphenol-A-fumarate polyester resin in a solvent, said polyester resin made by a process of reacting fumaric acid with a dihydric alcohol having the formula

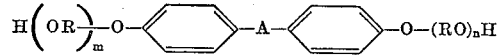

wherein R is an alkylene radical having 2 to 3 carbon atoms, A is a 2-alkylidene radical having 3 to 4 carbon atoms, $m$ and $n$ are each at least one and the average sum of $m$ and $n$ is not greater than 3, and
    (b) heating and reacting the dissolved polyester resin with cinnamoyl chloride to form the photopolymer.

References Cited
UNITED STATES PATENTS

| | | | |
|---|---|---|---|
| 2,634,251 | 4/1953 | Kass | 260—45.4 |
| 3,066,117 | 11/1962 | Thoma et al. | 260—77.5 |
| 3,357,831 | 12/1967 | Wu | 96—33 |

FOREIGN PATENTS

| | | |
|---|---|---|
| 1,112,277 | 5/1968 | Great Britain. |

MELVIN GOLDSTEIN, Primary Examiner

U.S. Cl. X.R.

96—86 P; 260—871